United States Patent
Takado (10) Patent No.: US 9,900,535 B2
(45) Date of Patent: Feb. 20, 2018

(54) SOLID-STATE IMAGING APPARATUS, IMAGING SYSTEM AND METHOD FOR DRIVING SOLID-STATE IMAGING APPARATUS

(71) Applicant: CANON KABUSHIKI KAISHA, Tokyo (JP)

(72) Inventor: Hisashi Takado, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 14/926,125

(22) Filed: Oct. 29, 2015

(65) Prior Publication Data
US 2016/0173796 A1   Jun. 16, 2016

(30) Foreign Application Priority Data

Dec. 10, 2014   (JP) .................................. 2014-250278

(51) Int. Cl.
*H04N 5/378* (2011.01)
*H04N 5/232* (2006.01)
*H04N 5/376* (2011.01)
*H04N 5/3745* (2011.01)

(52) U.S. Cl.
CPC ......... *H04N 5/378* (2013.01); *H04N 5/23241* (2013.01); *H04N 5/3765* (2013.01); *H04N 5/37455* (2013.01)

(58) Field of Classification Search
CPC .............. H04N 5/378; H04N 5/23241; H04N 5/37455; H04N 5/3765; H04N 5/374; H04N 5/3745

See application file for complete search history.

(56) References Cited

U.S. PATENT DOCUMENTS

2009/0179788 A1* 7/2009 Harper .................... H03M 5/04
341/155
2011/0242385 A1* 10/2011 Nishihara .............. H04N 5/378
348/308

OTHER PUBLICATIONS

U.S. Appl. No. 14/874,636, Hisashi Takado, filed Oct. 5, 2015.
U.S. Appl. No. 14/956,798, Kazuyuki Shigeta, filed Dec. 2, 2015.

* cited by examiner

*Primary Examiner* — Ahmed A Berhan
(74) *Attorney, Agent, or Firm* — Fitzpatrick, Cella, Harper & Scinto (57) ABSTRACT

A solid-state imaging apparatus includes: a pixel region configured to output an analog signal; an analog-to-digital conversion unit configured to convert the analog signal into a digital signal; and a transmitting unit configured to perform a transmission of a test signal and the digital signal obtained as a result of the conversion by the analog-to-digital conversion unit, the digital signal being transmitted subsequently to the test signal, and the analog-to-digital conversion unit converts the analog signal into the digital signal during a period of the transmission of the test signal by the transmitting unit.

15 Claims, 10 Drawing Sheets

| CODE | 8B<br>HGF_EDCBA | 10B<br>abcdei_fghj | |
|---|---|---|---|
| | | RD- | RD+ |
| K28.0 | 00011100 | 0011110100 | 1100001011 |
| K28.5 | 10111100 | 0011111010 | 1100000101 |
| D10.2 | 01001010 | 0101010101 | 0101010101 |

FIG. 8

FIG. 10

SOLID-STATE IMAGING APPARATUS, IMAGING SYSTEM AND METHOD FOR DRIVING SOLID-STATE IMAGING APPARATUS

BACKGROUND OF THE INVENTION

Field of the Invention

The present invention relates to a solid-state imaging apparatus, an imaging system and a method for driving a solid-state imaging apparatus.

Description of the Related Art

With increase in speed and pixel count of CMOS-type solid-state imaging apparatuses, there is an increasing demand for increase in data transmission capacity of an interface between a transmitting unit of a solid-state imaging apparatus and a receiving unit of a signal processor. In order to respond to such demand, a clock-embedded method in which data is coded by a method such as 8b10b conversion and clock information is embedded in data signals is employed rather than a transmission method using clock lines and data lines that are separate from each other.

In the clock-embedded method, a CDR (Clock Data Recovery) circuit inside a signal receiving apparatus performs clock recovery. After power-on or in driving mode switching, if output of signals from a transmitting unit is stopped for power consumption reduction, it is necessary the transmitting unit to send signals called a training sequence for clock recovery when operation of the transmitting unit is resumed. Japanese Patent Application Laid-Open No. 2012-120158 discloses transmitting a training sequence at the time of imaging mode switching.

SUMMARY OF THE INVENTION

According to an aspect of the present invention, a solid-state imaging apparatus includes: a pixel region that outputs an analog signal; an analog-to-digital conversion unit that converts the analog signal into a digital signal; and a transmitting unit that performs a transmission of a test signal and the digital signal obtained as a result of the conversion by the analog-to-digital conversion unit, the digital signal being transmitted subsequently to the test signal, and the analog-to-digital conversion unit converts the analog signal into the digital signal during a period of the transmission of the test signal by the transmitting unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

However, in Japanese Patent Application Laid-Open No. 2012-120158, driving of a solid-state imaging apparatus starts after termination of a training sequence, a waiting period occurs after the termination of the training sequence until start of pixel data output. In addition, in order to keep a clock phase for an interface locked even during the waiting period, a transmitting unit needs to send a code called an idle code, which leads to an increase in waiting period until pixel output from the solid-state imaging apparatus.

The below exemplary embodiments relate to a technique in which a waiting period from termination of transmission of test signals until start of transmission of digital signals is reduced.

First Exemplary Embodiment

Figure 1:
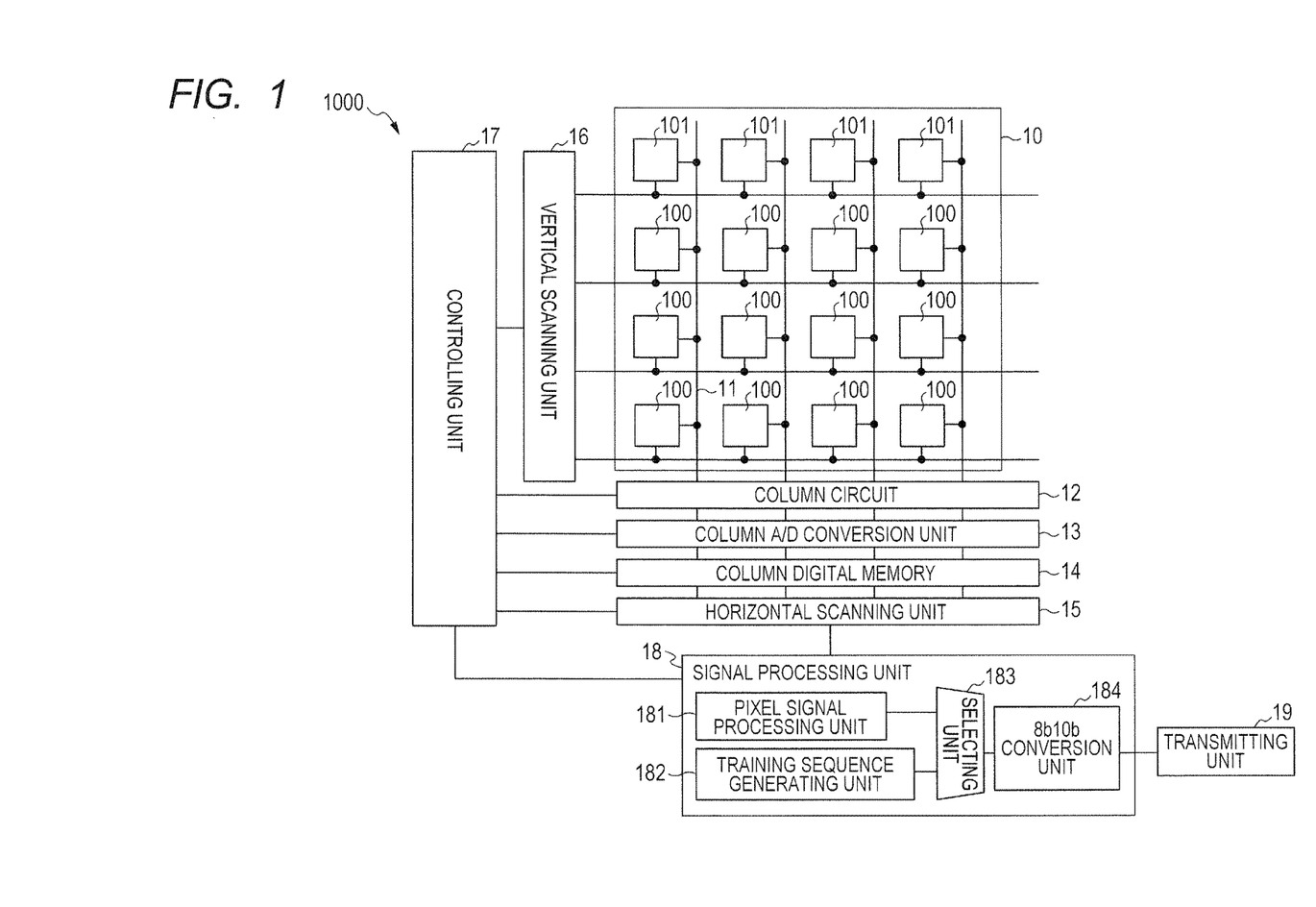
FIG. 1 is a diagram illustrating an overall configuration of a solid-state imaging apparatus according to a first exemplary embodiment.

FIG. 1 is an example configuration of a solid-state imaging apparatus 1000 according to a first exemplary embodiment of the present invention. The solid-state imaging apparatus 1000 includes a pixel region 10, vertical output lines 11, a column circuit 12, a column analog-to-digital conversion unit (column A/D conversion unit) 13, a column digital memory 14, a horizontal scanning unit 15, a vertical scanning unit 16, a controlling unit 17, a signal processing unit 18 and a transmitting unit 19. The pixel region 10 includes effective pixels 100 each including a photoelectric conversion portion, and non-effective pixels 101 each including no photoelectric conversion portion. In FIG. 1, for simplicity of the description, the effective pixels 100 are illustrated in three rows and four columns and the non-effective pixels 101 are illustrated in one row and four columns; however, in reality, more pixels are arranged to provide more rows and more columns. FIG. 1 illustrates four rows and four columns of pixels.

The vertical output line 11 of each column is connected to the pixels 100 or 101 in the relevant column. A vertical scanning unit 16 selects a row of pixels 100 or 101. The pixels 100 or 101 in the selected row output respective analog signals (analog voltages) to the vertical output lines 11 in the respective columns. The column circuit 12 performs sampling and holding processing of the signals from the vertical output lines 11 in the respective columns. Here, the column circuit 12 may have a gain amplification function.

The column A/D conversion unit 13 converts the analog signals in the respective columns output from the column circuit 12 into digital values. The column A/D conversion unit 13 is, for example, a single-slope A/D conversion unit including counters, a ramp signal generating unit and comparators for the respective columns. The ramp signal generating unit generates a ramp signal RAMP (FIG. 3) whose level varies with time. Upon the ramp signal generating unit starting varying the level of the ramp signal RAMP, the counters each start counting of a count value. The comparators for the respective columns compare the respective analog output signals in the respective columns from the column circuit 12 with the ramp signal RAMP. The count values of the counters at the respective points of time of inversion of the output signals from the comparators for the respective columns are output as digital values of the respective columns from the column A/D conversion unit 13. In such a manner as described above, the column A/D conversion unit 13 performs analog-to-digital conversion.

The column digital memory 14 includes memories that hold the digital output values of the respective columns provided as a result of the analog-to-digital conversion by the column A/D conversion unit 13, and for the column digital memory 14, e.g., SRAMs or flip-flops are used. The horizontal scanning unit 15 sequentially output the digital values of the respective columns held by the column digital memory 14 to the signal processing unit 18. For the horizontal scanning unit 15, a circuit such as a shift register or a decoder is used. The vertical scanning unit 16 selects a row in the pixel region 10 according to a control signal from the controlling unit 17. For the vertical scanning unit 16, a circuit such as a shift register or a decoder is used. The controlling unit 17 controls operation of each of the column circuit 12, the column A/D conversion unit 13, the column digital memory 14, the horizontal scanning unit 15, the vertical scanning unit 16, the signal processing unit 18 and the transmitting unit 19.

The signal processing unit 18 includes a pixel signal processing unit 181, a training sequence generating unit 182, a selecting unit 183 and an 8b10b conversion unit 184. The pixel signal processing unit 181 performs signal processing such as correlated double sampling (CDS) processing, offset adjustment and gain adjustment on the digital values of the respective columns output from the column digital memory 14. Also, for the subsequent processing in the 8b10b conversion unit 184, the pixel signal processing unit 181 converts pixel data into an 8-bit format. The training sequence generating unit 182 is a circuit that generates training sequence data (test signal) for performing clock recovery in a receiving unit of a signal processor, and has a function that generates fixed digital values. The selecting unit 183 selects output signals from the pixel signal processing unit 181 or output signals from the training sequence generating unit 182 based on a control signal from the controlling unit 17. The 8b10b conversion unit 184 transmits data of 10-bit units obtained by performing 8b10b conversion of the output signals selected by the selecting unit 183, to the transmitting unit 19. A circuit configuration of the 8b10b conversion unit 184 may be a lookup table-type code conversion circuit using a memory or a combinational circuit.

The transmitting unit 19 includes a circuit that performs parallel-to-serial conversion of 10-bit data output from the signal processing unit 18 and a circuit that transmits the serialized data as differential signals. The differential signals may be of an LVDS (Low Voltage Differential Signaling) method or a SLVS (Scalable Low Voltage Signaling) method.

Figure 2:
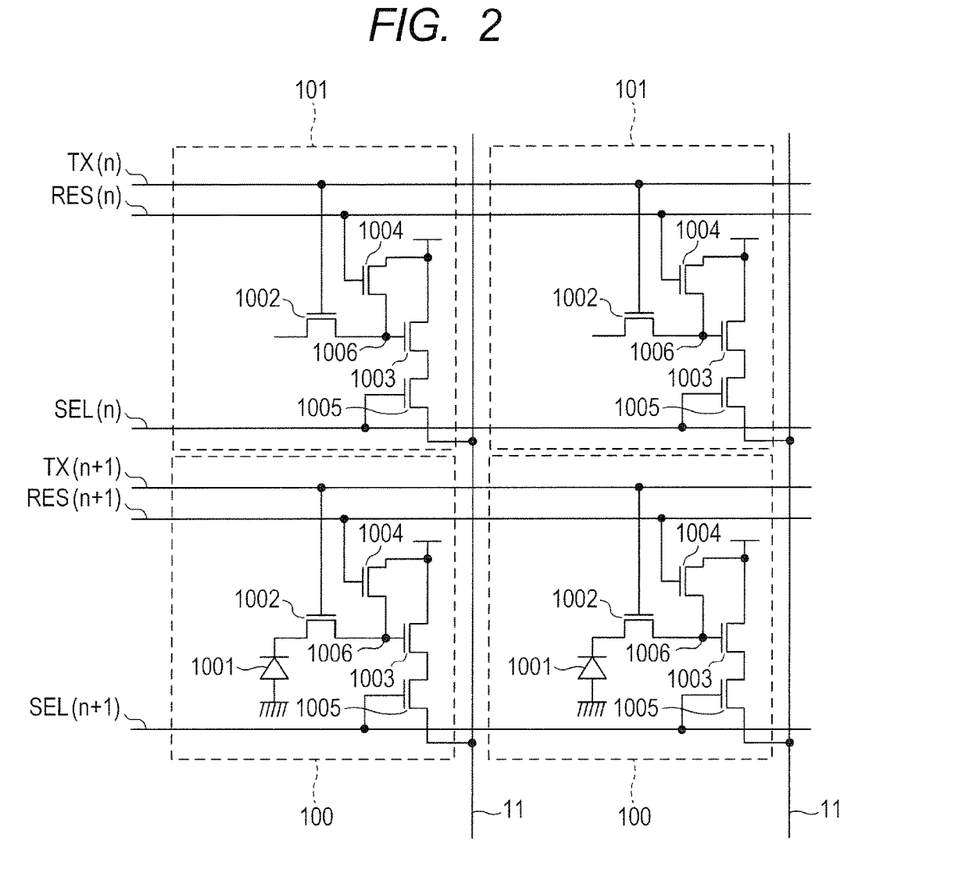
FIG. 2 is a diagram illustrating a pixel array configuration in the solid-state imaging apparatus according to the first exemplary embodiment.

FIG. 2 is a circuit diagram illustrating an example configuration of the pixel region 10 in FIG. 1. In FIG. 2, members that are similar to those in FIG. 1 are provided with reference numerals that are the same as those in FIG. 1. The pixel region 10 includes the effective pixels 100, the non-effective pixels 101 and the vertical output lines 11. In FIG. 2, for simplicity of description, one row and two columns of effective pixels 100 and one row and two columns of non-effective pixels 101 are illustrated; however, in reality, more rows and more columns of effective pixels 100 and non-effective pixels 101 are arranged. In the present exemplary embodiment, the effective pixels 100 and the non-effective pixels 101 are driven by, e.g., respective drive signals TX(n), RES(n) and SEL(n) output by the vertical scanning unit 16, and outputs respective pixel signals to the respective vertical output lines 11.

Each effective pixel 100 includes a photoelectric conversion portion 1001, a transfer transistor 1002, an amplifying transistor 1003 and a floating diffusion portion (FD portion) 1006. Each effective pixel 100 may further include a reset transistor 1004 and a selecting transistor 1005. The photoelectric conversion portion 1001, which includes, for example, a photo diode, performs photoelectric conversion of incident light and accumulates charge generated as a result of the conversion. Here, the charge generated by the photoelectric conversion portion 1001 may be held in a charge holding portion disposed between the photoelectric conversion portion 1001 and the FD portion 1006. The transfer transistor 1002 transfers the charge accumulated in the photoelectric conversion portion 1001 to the FD portion 1006. A potential of the FD portion 1006 varies according to the amount of the charge transferred to the FD portion 1006. The amplifying transistor 1003, which provides a source follower (SF) circuit, buffers the voltage in the FD portion 1006 and outputs the voltage to the corresponding vertical output line 11 via the selecting transistor 1005. The reset transistor 1004 resets the potential of the FD portion 1006 to a reset voltage supplied by a power supply line. The selecting transistor 1005 connects an output node of the amplifying transistor 1003 to the vertical output line 11.

The non-effective pixels 101 are the same as the effective pixels 100 excepts that the non-effective pixels 101 each include no photoelectric conversion portion 1001. In other words, each non-effective pixel 101 includes a transfer transistor 1002, an amplifying transistor 1003, a reset transistor 1004, a selecting transistor 1005 and an FD portion 1006. Signals from the non-effective pixels 101 enable removal of fixed pattern noise in the circuit components other than the photoelectric conversion portions 1001.

An nth-row signal TX(n) is supplied to a gate of the transfer transistor 1002 in each of pixels in the nth row. An nth-row signal RES(n) is supplied to a gate of the reset transistor 1004 in each of the pixels in the nth row. An nth-row signal SEL(n) is supplied to a gate of the selecting transistor 1005 in each of the pixels in the nth row.

An n+1-th-row signal TX(n+1) is supplied to a gate of the transfer transistor 1002 in each of pixels in the n+1-th row. An n+1-th-row signal RES(n+1) is supplied to a gate of the reset transistor 1004 in each of the pixels in the n+1-th row. An n+1-th-row signal SEL(n+1) is supplied to a gate of the selecting transistor 1005 in each of the pixels in the n+1-th row.

Figure 3:
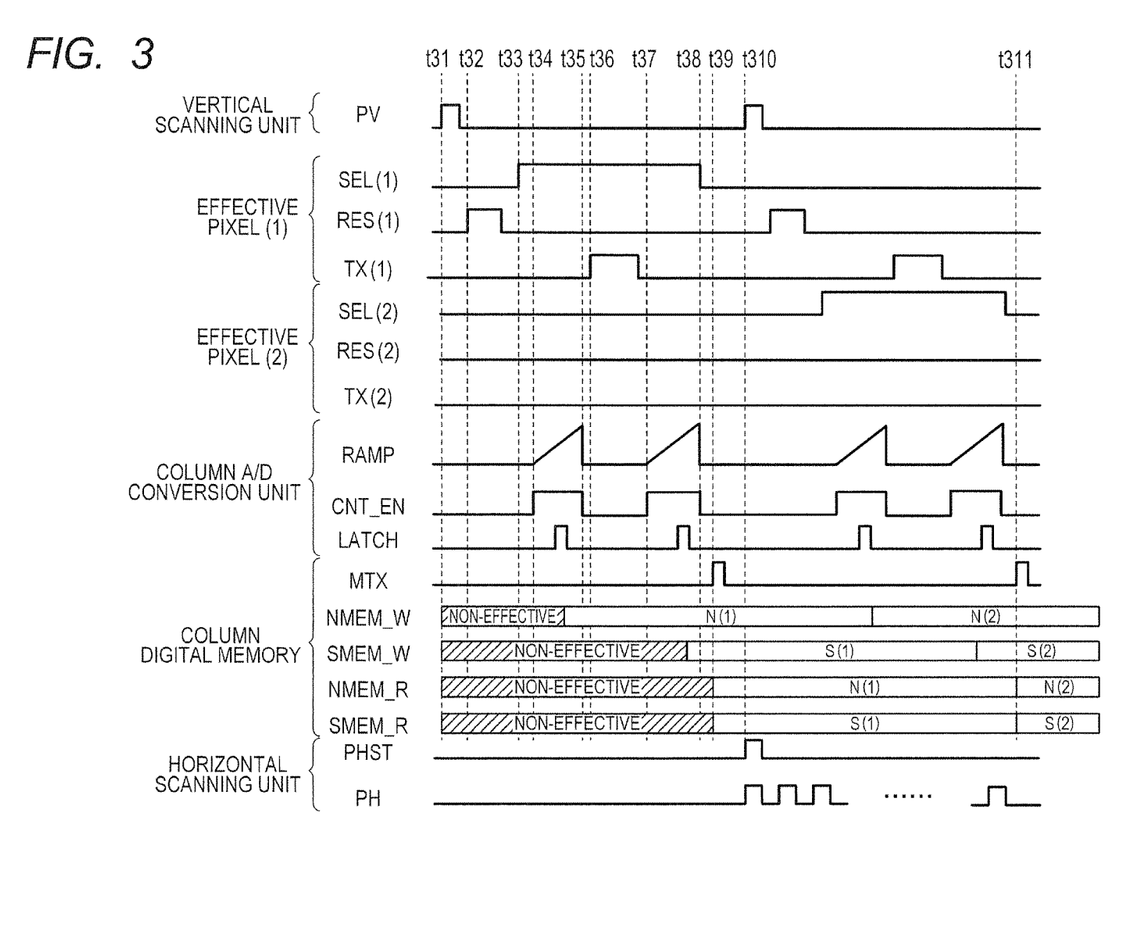
FIG. 3 is a diagram indicating reading timings in the solid-state imaging apparatus according to the first exemplary embodiment.

FIG. 3 illustrates a drive method for reading pixels in one row in the solid-state imaging apparatus 1000. Although a method for reading effective pixels 100 is the same as a method for reading non-effective pixels 101, FIG. 3 illustrates a method for reading effective pixels 100.

At a time t31, the controlling unit 17 sets a selecting signal PV of the vertical scanning unit 16 to a high level, thereby providing a row selection instruction. At a time t32, the vertical scanning unit 16 sets a signal RES(1) to a high level. Then, the reset transistors 1004 in the first row are turned on and the FD portions 1006 in the first row are reset to the reset voltage. Subsequently, the vertical scanning unit 16 sets a signal RES(1) to a low level, whereby the reset transistors 1004 in the first row are turned off and the FD portions 1006 are held at the reset voltage. At a time t33, the vertical scanning unit sets a signal SEL(1) to a high level. Then, the selecting transistors 1005 in the first row are turned on, whereby the pixels in the first row are selected. The amplifying transistors 1003 in the first row output respective noise signals that are based on the reset voltage of the FD portions 1006, to the respective vertical output lines 11.

At a time t34, the controlling unit 17 sets a signal CNT_EN of the column A/D conversion unit 13 to a high level. Then, the column A/D conversion unit 13 starts varying a level of a ramp signal RAMP and starts counting of count values. During a period from the time t34 to a time t35, the column A/D conversion unit 13 performs analog-to-digital conversion of the noise signals in each column of the first row, which are based on the reset voltage of the FD portions 1006. In other words, at a time when each of the noise signals that are based on the reset voltage of the FD portion 1006 and the ramp signal RAMP become the same, output signals from the comparators are inverted and the signal LATCH changes to a high level. Then, the count values from the column A/D conversion unit 13 are written as digital values N(1) in respective writing memories NMEM_W in the column digital memory 14. The digital values N(1) are values obtained as a result of analog-to-digital conversion of the noise signals that are based on the reset voltage.

At a time t36, the vertical scanning unit 16 sets a signal TX(1) to a high level. Then, in the first row, the transfer transistors 1002 are turned on, and charges subjected to photoelectric conversion by the photoelectric conversion portions 1001 are transferred to the FD portions 1006. The amplifying transistors 1003 output respective pixel signals based on the voltages of the respective FD portions 1006.

At a time t37, the controlling unit 17 sets the signal CNT_EN of the column A/D conversion unit 13 to a high level. Then, the column A/D conversion unit 13 starts varying the level of the ramp signal RAMP and starts counting of count values. During a period from the time t37 to a time t38, the column A/D conversion unit 13 performs analog-to-digital conversion of the pixel signals that are based on the voltages of the respective FD portions 1006. In other words, at a time when each of the pixel signals that are based on the voltages of the respective FD portions 1006 and the ramp signal RAMP becomes the same, the output signals from the comparators are inverted and the signal LATCH changes to a high level. Then, the count values from the column A/D conversion unit 13 are written as digital values S(1) in respective writing memories SMEM_W in the column digital memory 14. The digital values S(1) are values obtained by analog-to-digital conversion of the pixel signals.

At a time t39, the controlling unit 17 sets a signal MTX of the column digital memory 14 to a high level. Then, the digital values N(1) are transferred from the writing memories NMEM_W in the column digital memory 14 to reading memories NMEM_R, and the digital values S(1) are transferred from the writing memories SMEM_W to reading memories SMEM_R.

At a time t310, the controlling unit 17 sets a signal PHST of the horizontal scanning unit 15 to a high level. Then, the horizontal scanning unit 15 starts scanning, and sequentially outputs pulses of a signal PH for the respective columns to the column digital memory 14. During a period from the time t310 to a time t311, each time the signal PH is set to a high level, a relevant one of the columns in the first row is selected in turn. Consequently, the signals N(1) and S(1) of the pixels in the first row are output from the reading memories NMEM_R and SMEM_R in the column digital memory 14 to the signal processing unit 18.

Also, during the period from the time t310 to the time t311, as in the above reading processing for the first row in the times t31 to t310, reading processing for a second row is performed.

Figure 4:
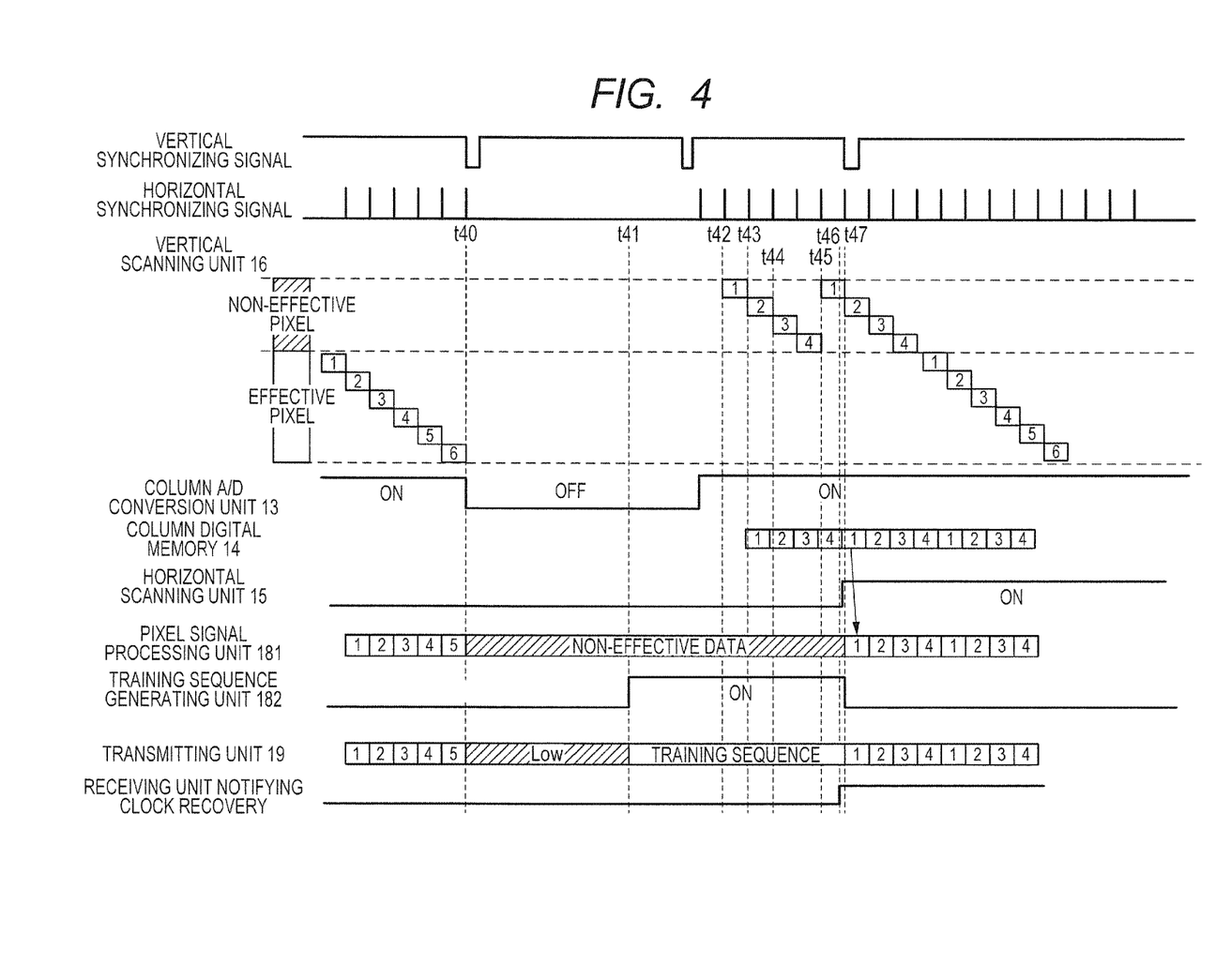
FIG. 4 is a timing chart of mode switching in the solid-state imaging apparatus.

FIG. 4 is a timing chart indicating a drive method at the time of mode switching in the solid-state imaging apparatus 1000 in FIG. 1. In FIG. 4, for simplicity, an example of four rows of non-effective pixels 101 and six rows of effective pixels 100 are illustrated; however, in reality, more rows and more columns of pixels are arranged.

At a time t40, reading operation is stopped. Operation of each of the vertical scanning unit 16, the column circuit 12, the column A/D conversion unit 13, the horizontal scanning unit 15, the signal processing unit 18 and the transmitting unit 19 is stopped. At a time t41 onwards, an operation resumption sequence after a mode is switched to another is indicated.

At the time t41, training sequence generating operation of the training sequence generating unit 182 is started and output of the transmitting unit 19 is started, whereby training sequence data is output from the transmitting unit 19.

At a time t42, the vertical scanning unit 16 and the column A/D conversion unit 13 start operating. The vertical scanning unit 16 selects the first row of non-effective pixels 101. During a period from the time t42 to a time t43, the column A/D conversion unit 13 performs analog-to-digital conversion of signals of the non-effective pixels 101 in the first row. The column digital memory 14 store digital values N(1) and S(1) obtained as a result of the analog-to-digital conversion into the respective writing memories NMEM_W and SMEM_W. In FIG. 4, indication of 1 in a square box represents digital values N(1) and S(1) of the first row. A specific reading period is the period from the time t31 to time t38 in FIG. 3. Since the horizontal scanning unit 15 is kept off, input data in the pixel signal processing unit 181 remain as non-effective data.

During a period from the time t43 to a time t44, signals of non-effective pixels 101 in the second row are read. The reading operation is the same as that in the period from the time t31 to time t38 in FIG. 3. At the time t44, since the column digital memory 14 has a capacity for only one row, the digital values N(1) and S(1) of the first row are overwritten and digital values N(2) and S(2) of the second row remain. At the time t44 onwards, signals of non-effective pixels 101 in the third row onwards are read in turn.

During a period from a time t45 to a time t47, the training sequence operation is switched to pixel output operation. At the time t45, operation for reading the signals of the non-effective pixels 101 in the first row is started. At a time t46 during the reading of the signals of the non-effective pixels 101 in the first row, the receiving unit of the signal processor provides a notification for effective pixel reading to the controlling unit 17 at a stage of completion of clock recovery in the receiving unit of the signal processor and completion of preparation for pixel signal reception. If the analog-to-digital conversion of the signals of the non-effective pixels 101 in the first row is completed at the time t46, the controlling unit 17 starts horizontal scanning operation for the digital values N(1) and S(1) of the non-effective pixels 101 in the first row during a period from the time t46 to a time t47. Then, the horizontal scanning unit 15 outputs the digital values N(1) and S(1) of the first row in the column digital memory 14 to the signal processing unit 18. If the analog-to-digital conversion of the signals of the non-effec-tive pixels 101 in the first row is not completed at the time t46, horizontal scanning operation for the digital values N(1) and S(1) of the non-effective pixels 101 in the first row is started after completion of the analog-to-digital conversion of the signals of the non-effective pixels 101 in the first row.

At a time t47, reading of signals of the non-effective pixels in the second row is started, and the training sequence generating unit 182 terminates the training sequence generating operation, and the data is output from the column digital memory 14 to the pixel signal processing unit 181. Furthermore, the controlling unit 17 causes the selecting unit 183 in the signal processing unit 18 to terminate the selection of the output signals from the training sequence generating unit 182 and start the selection of the output signals from the pixel signal processing unit 181. Consequently, the output signals of the transmitting unit 19 are switched from the training sequence to the pixel output signals. Since the column digital memory 14 holds the digital values N(1) and S(1) of the first row obtained by the analog-to-digital conversion before the switching, the transmitting unit 19 can output the pixel output signals with no waiting period after the termination of the training sequence.

As described above, the transmitting unit 19 transmits the training sequence data (test signal) during the times t41 to t47, and at the subsequent time t47 onwards, transmits digital signals that are based on the digital values obtained by the conversion by the column A/D conversion unit 13. During the period of the times t42 to t47 in which the transmitting unit 19 is transmitting the training sequence data, the column A/D conversion unit 13 converts the analog signals to the digital values. Consequently, the transmitting unit 19 can transmit the digital signals that are based on the digital values obtained as a result of the conversion by the column A/D conversion unit 13, immediately after termination of the transmission of the training sequence data.

Upon input of a clock recovery completion notification (test completion notification) from the receiving unit of the signal processor at the time t46, the transmitting unit 19 terminates the transmission of the training sequence data and starts transmission of the digital signals that are based on the digital values obtained as a result of the conversion by the column A/D conversion unit 13, at the time t47. During the period of the times t42 to t47 in which the transmitting unit 19 is transmitting the training sequence data, the non-effective pixels 101 in the pixel region 10 output analog signals to the column A/D conversion unit 13 via the column circuit 12. After the time t41 when the transmitting unit 19 starts the transmission of the training sequence data, the non-effective pixels 101 in the pixel region 10 starts output of analog signals to the column A/D conversion unit 13 via the column circuit 12 at the time t42.

The pixel region 10 includes the plurality of pixels 100 and 101 arranged in a matrix, each of the plurality of pixels 100 and 101 outputting an analog signal. According to control performed by the vertical scanning unit 16, the plurality of pixels 100 and 101 sequentially output respective analog signals to the column A/D conversion unit 13 via the column circuit 12 on a row-by-row basis. Also, the pixel region 10 includes rows of effective pixels 100 each including a photoelectric conversion portion 1001 and rows of non-effective pixels 101 each including no photoelectric conversion portion 1001. The rows of non-effective pixels 101 output analog signals to the column A/D conversion unit 13 via the column circuit 12 during the period of the times t42 to t47 in which the transmitting unit 19 is transmitting the training sequence data.

The 8b10b conversion unit 184 performs 8b10b conversion of the training sequence data or the digital signals that are based on the digital values obtained as a result of the conversion by the column A/D conversion unit 13. The transmitting unit 19 transmits the training sequence data subjected to the above 8b10b conversion at the times t41 to t47, and transmits the digital signals subjected to the above 8b10b conversion at the subsequent time t47 onwards.

Figure 5:
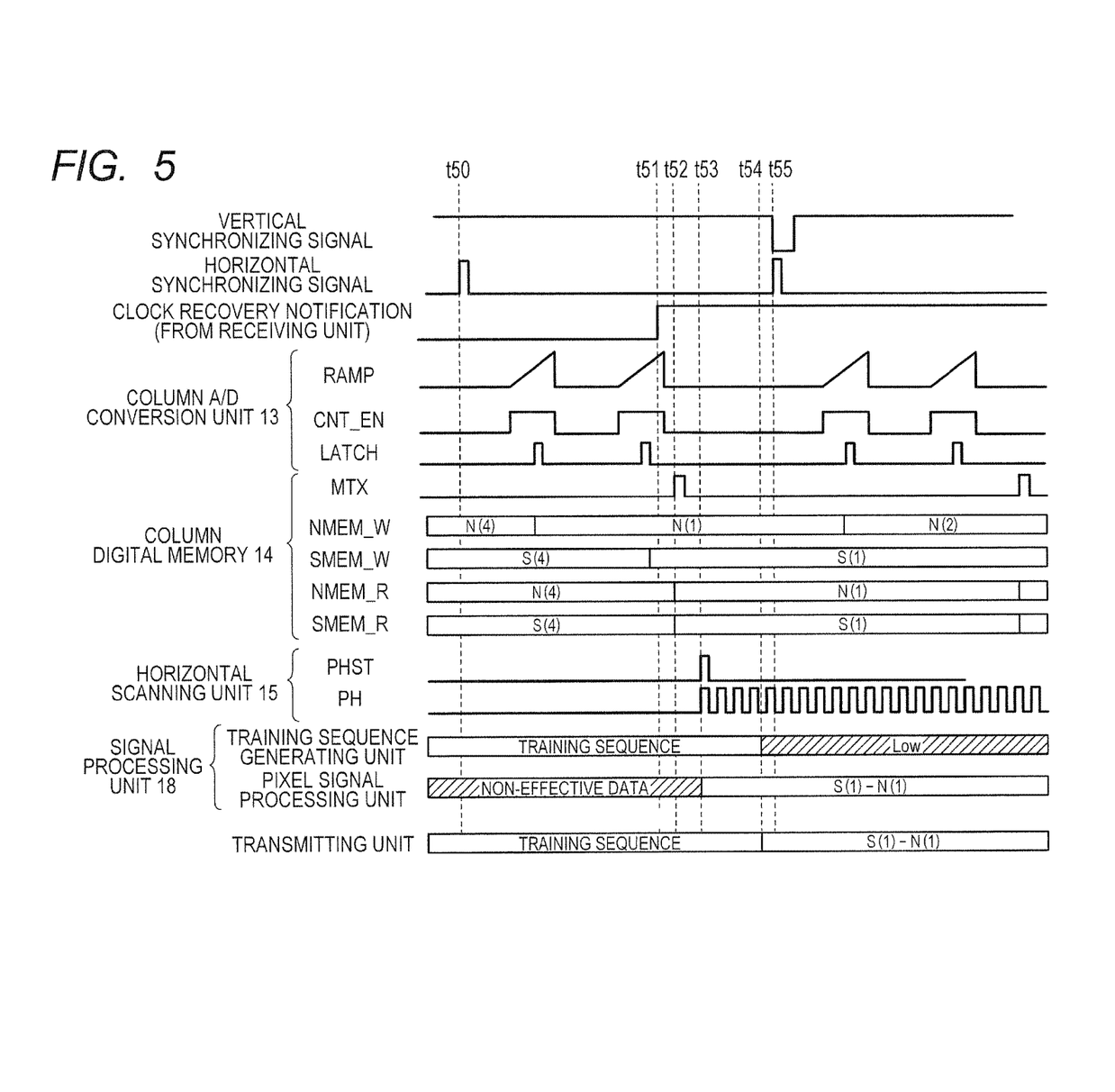
FIG. 5 is a detailed timing chart of mode switching in the solid-state imaging apparatus.

FIG. 5 is a timing chart indicating operation timings for the respective circuits during the period from the time t45 to the time t47 in FIG. 4 in detail. At a time t50, reading of signals of the non-effective pixels 101 in the first row is started. At a time t51, the receiving unit of the signal processor outputs a clock recovery notification to the controlling unit 17. At the time t51, since digital values N(4) and S(4) of a previous row are written in the reading memories NMEM_R and SMEM_R in the column digital memory 14, and thus, horizontal scanning operation cannot immediately be started.

At a time t52, the controlling unit 17 sets the signal MTX of the column digital memory 14 to a high level to write the digital values N(1) and S(1) of the non-effective pixels 101 in the first row into the respective reading memories NMEM_R and SMEM_R in the column digital memory 14. At a time t53, the controlling unit 17 sets the signal PHST of the horizontal scanning unit 15 to a high level. Then, the horizontal scanning unit 15 sequentially sets the signals PH for the respective columns to a high level, whereby the digital values N(1) and S(1) are output from the respective reading memories NMEM_R and SMEM_R in the column digital memory 14 to the signal processing unit 18. The pixel signal processing unit 181 outputs values S(1)–N(1) obtained by subtracting the digital values N(1) from the respective digital values S(1) by means of CDS processing. Since there is a latency in the processing in the pixel signal processing unit 181, at the time t54, the transmitting unit 19 terminates the training sequence transmission and starts transmission of the pixel output signals S(1)–N(1).

While if vertical scanning is started after input of the clock recovery notification, a waiting period from the termination of the training sequence to the output of the pixel output signals lasts for times t50 to time t54, in the present exemplary embodiment, such waiting period can be reduced to a period of the times t51 to t53.

If the clock recovery notification is provided at a timing close to start reading operation for a certain row, in the reading operation in FIG. 5, the effect of reducing the waiting period is small. Therefore, another reading method is also employed as an exemplary embodiment.

Figure 6:
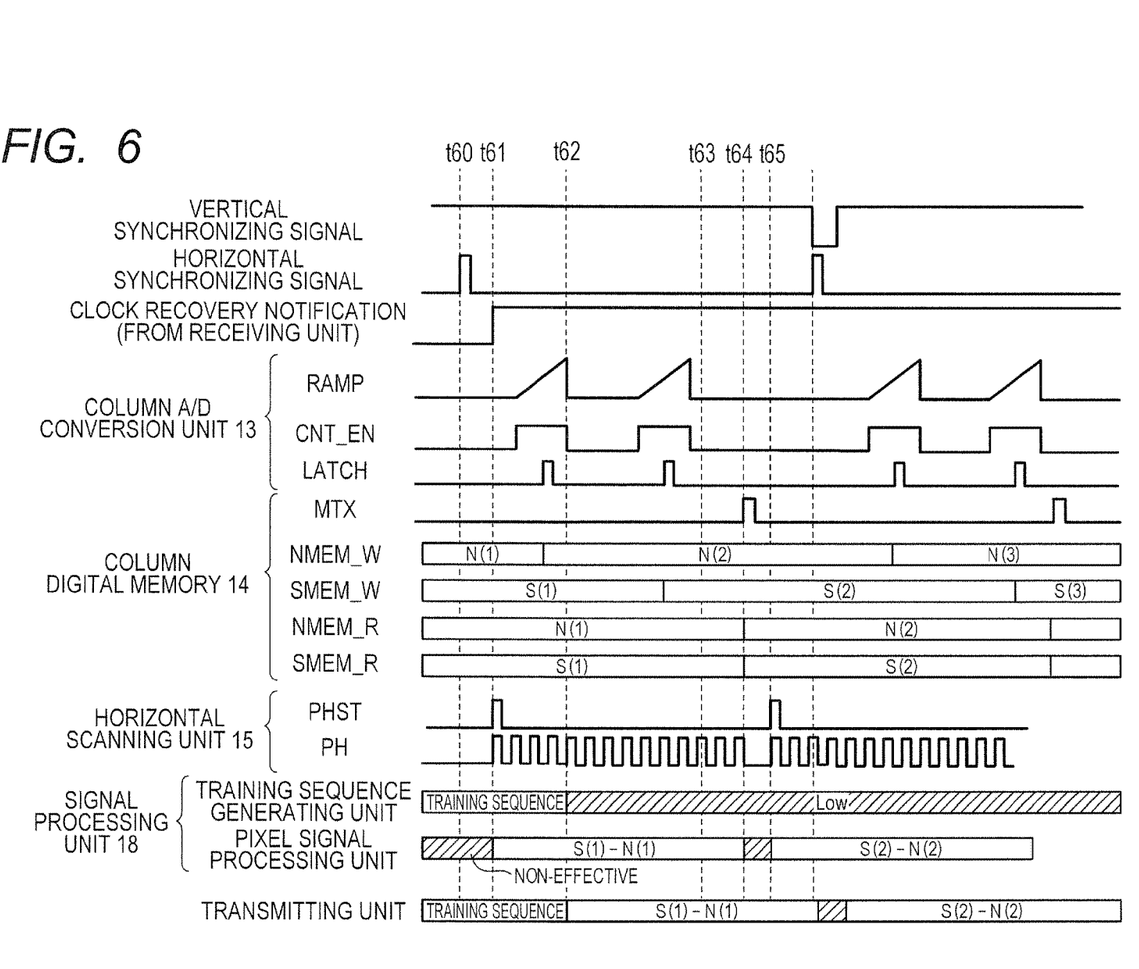
FIG. 6 is a detailed timing chart of mode switching in the solid-state imaging apparatus.

FIG. 6 is a timing chart indicating another example of a timing of switching from a training sequence to a pixel output signal. At a time t60, reading of signals of the non-effective pixels 101 in the second row is started. At a time t61, the controlling unit 17 sets the signal PHST of the horizontal scanning unit 15 to a high level. Then, the horizontal scanning unit 15 sequentially sets the signals PH for the respective columns to a high level to output digital values N(1) and S(1) of the non-effective pixels 101 in the first row from the reading memories NMEM_R and SMEM_R in the column digital memory 14 to the signal processing unit 18. The pixel signal processing unit 181 outputs values S(1)–N(1) obtained by subtracting the digital values N(1) from the respective digital values S(1) by means of CDS processing. Since there is a latency in the processing in the pixel signal processing unit 181, at a time t62, the transmitting unit 19 terminates transmission of the training sequence and starts transmission of the pixel output signals S(1)–N(1).

A time t63 is a timing for setting the signal MTX of the column digital memory 14 to a high level for normal reading for one row (FIG. 5). However, compared to a timing for normal reading for one row (FIG. 5), the time t61 for starting reading by the horizontal scanning unit 15 is delayed relative to the time t60 for starting pixel reading. Thus, if the signal MTX is set to a high level, the digital values N(1) and S(1) in the reading memories NMEM_R and SMEM_R, which are being read by the horizontal scanning unit 15, are overwritten. Therefore, the controlling unit 17 does not set the signal MTX to a high level at the time t63, but sets the signal MTX to a high level at a time t64 when the horizontal scanning of the digital values N(1) and S(1) in the first row is completed.

At a time t65, the controlling unit 17 resets the horizontal scanning unit 15, and sets the signal PHST of the horizontal scanning unit 15 to a high level. Then, the horizontal scanning unit 15 sequentially sets the signal PH to a high level for the respective columns, and outputs digital values N(2) and S(2) of the non-effective pixels 101 in the second column from the reading memories NMEM_R and SMEM_R to the signal processing unit 18.

Although it is necessary to change a timing for column reading when a clock recovery notification is input, if vertical scanning is started after the input of the clock recovery notification, a waiting period from termination of the training sequence until output of pixel output signals lasts from the time t60 to a time t65. On the other hand, in the present exemplary embodiment, such period can be reduced to a period of the time t61 to the time t62.

Figure 7A:
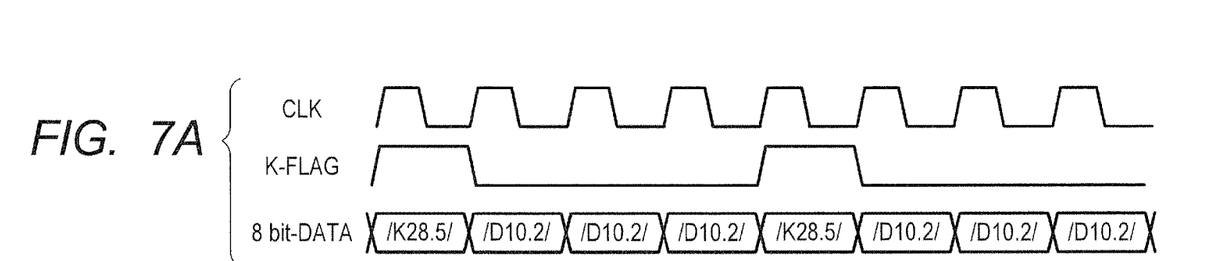
FIGS. 7A, 7B and 7C are diagrams each illustrating an example of a training sequence from the solid-state imaging apparatus.
Figure 7B:
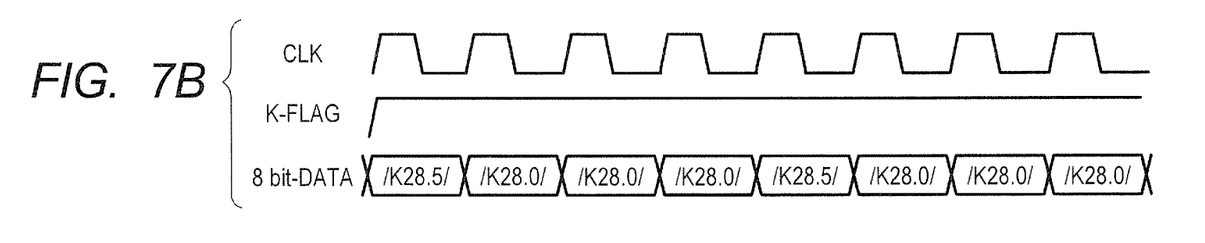
Figure 7C:
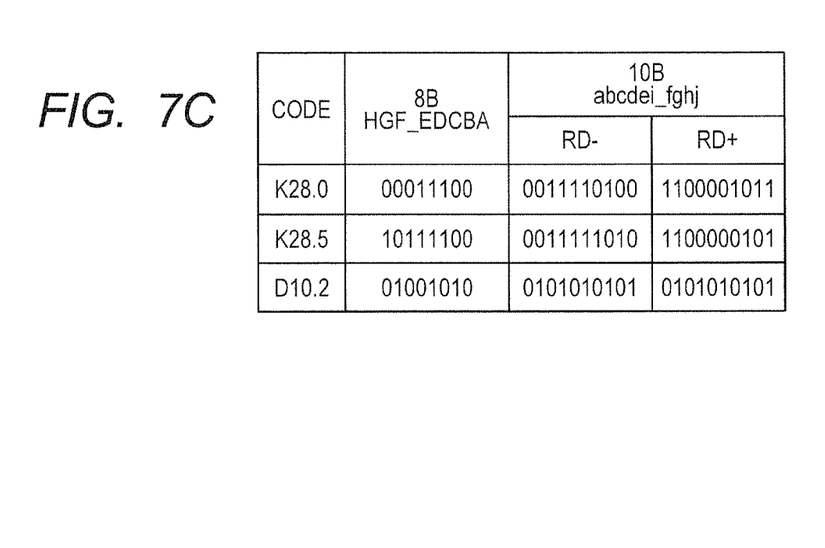

FIGS. 7A to 7C are diagrams each illustrating the training sequence data output by the training sequence generating unit 182. Data output by the training sequence generating unit 182 is defined by a transmission/reception protocol so that the receiving unit of the signal processor can perform clock recovery for the output data. FIG. 7A illustrates 8-bit data before 8b10b conversion, the 8-bit data being output by the training sequence generating unit 182. K28.5 is a code defined by the 8b10b conversion standards called K codes. "10111100" indicated in the second column of the FIG. 7C is an actual 8-bit code. The training sequence generating unit 182 sets each of the 8-bit data and a K flag indicating that the relevant 8-bit data is a K code to a high level and transmits the 8-bit data and the K flag to the 8b10b conversion unit 184. Then, the 8b10b conversion unit 184 converts the above 8-bit data into a 10-bit code, which is indicated in the third column in FIG. 7C. "RD−" and "RD+" in FIG. 7C indicate that there are two types of results of the 10-bit conversion by the 8b10b conversion unit 184. Whether RD− or RD+ is to be used is determined by a symbol called "running disparity", which is determined by a previous data conversion result. A previous symbol of a running disparity is kept as it is if the number of zeros and the number of ones included in previous 10-bit conversion data are the same, and the running disparity is switched from a high level to a low level or from a low level to a high level if the number of zeros and the number of ones are different from each other. Consequently, both six or more consecutive zeros and six or more consecutive ones can be avoided.

In FIG. 7A, with a next pulse of a clock signal CLK, the training sequence generating unit 182 outputs a D10.2 code. The D10.2 code is an 8-bit code indicated in the second column in FIG. 7C. This is not a K code and thus the K flag is at a low level. After that, the training sequence generating unit 182 sequentially outputs a D10.2 code and a D10.2 code in synchronization with the clock signal CLK. The training sequence generating unit 182 repeats the output with four pulses of the clock signal CLK as a unit.

FIG. 7B indicates another example of data output by the training sequence generating unit 182. The training sequence generating unit 182 outputs a K28.5 code, a K28.0 code, a K28.0 code and a K28.0 code in synchronization with four pulses of the clock signal CLK. The training sequence generating unit 182 repeats the output with this unit as a unit. Specific codes of the K28.5 code and the K28.0 codes are indicated in the second column in FIG. 7C.

The training sequence indicated here is an example, and may be changed depending on the protocol of the receiving unit of the signal processor and thus is not limited to this example. In the first exemplary embodiment, it is desirable that pixels read during a period of training sequence transmission be non-effective pixels 101. A reason of that will be described below. A period of training sequence transmission is determined by a period of time until the receiving unit of the signal processor completes clock recovery according to the training sequence; however, a time of completion of clock recovery is uncertain and may slightly vary depending on the state of the transmission/reception interface. Therefore, in order to store digital values in the column digital memory 14 before the training sequence terminates, it is necessary to start pixel selection and output operation by the vertical scanning unit 16 in consideration of the uncertainty of the time of the training sequence. If the termination of the training sequence is delayed by time corresponding to reading of one row or more, signals of pixels in the first row remain unread by the transmitting unit 19. In the case of the effective pixels 100, charge in each photoelectric conversion portion 1001 is destructed for reading and thus, the signals of the pixels in the first row become completely non-effective, but in the case of the non-effective pixels 101, there is no photoelectric conversion portion 1001 and non-destructive reading is performed, enabling re-reading. Therefore, it is desirable that pixels read during the transmission of the training sequence be non-effective pixels 101.

Although FIG. 4 indicates a case where the pixel reading operation is stopped and operation of each of the vertical scanning unit 16, the column circuit 12, the column A/D conversion unit 13, the horizontal scanning unit 15, the signal processing unit 18 and the transmitting unit 19 is stopped at the time t40, the present invention is not limited to this case. With no interval after the time t40, training sequence generating operation may be started at the time t41. In other words, the time t40 and the time t41 may be equal to each other. This case provides fastest operation in the present exemplary embodiment.

Figure 8:
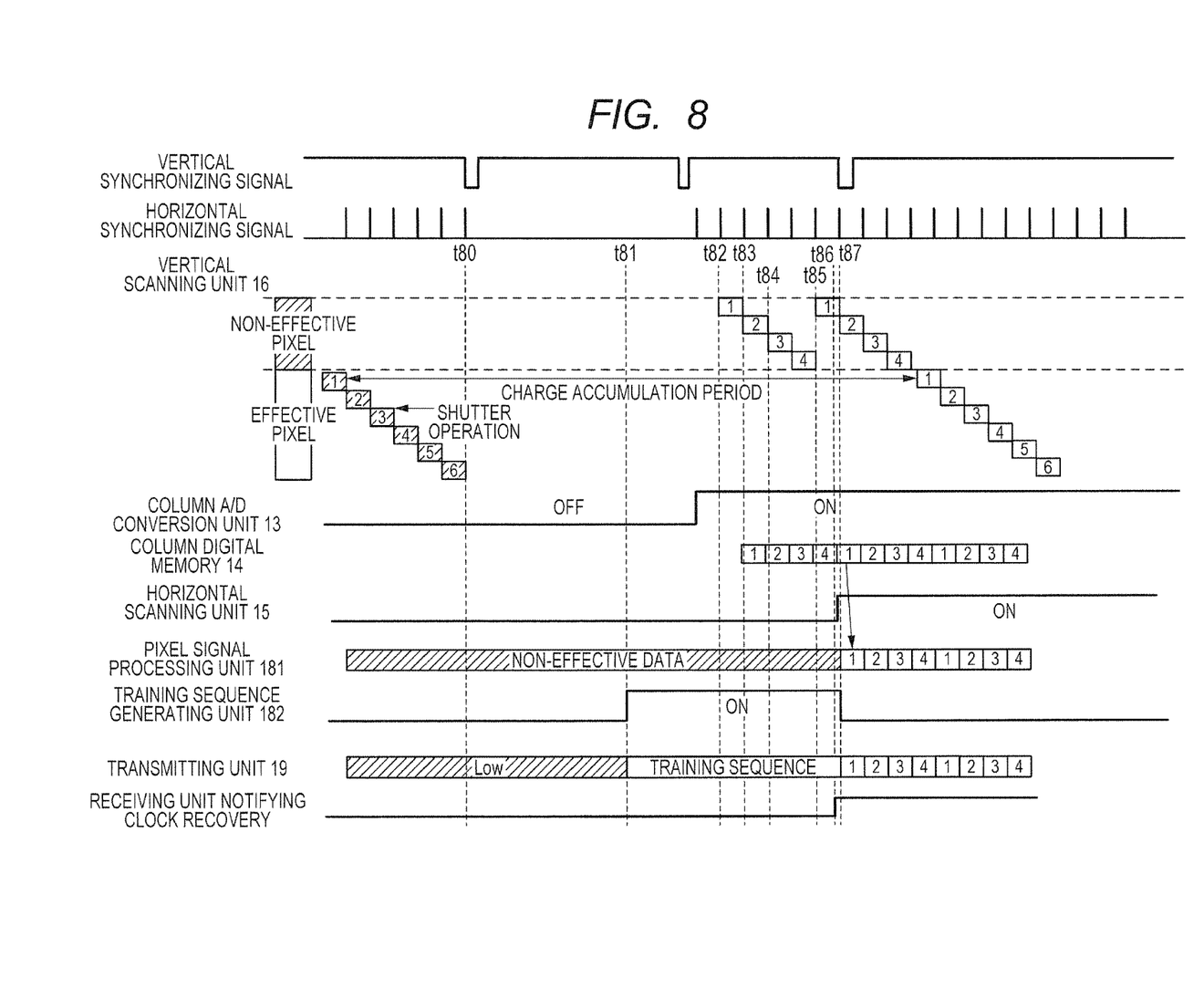
FIG. 8 is a timing chart at the time of charge accumulation for long seconds of time in the solid-state imaging apparatus.

FIG. 8 is a timing chart at the time of charge accumulation for long seconds of time in the solid-state imaging apparatus 1000 in FIG. 1. In FIG. 4, for simplicity, four rows of non-effective pixels 101 and six rows of effective pixels 100 are illustrated; however, in reality, more rows and more columns of pixels are arranged. At a time t80, shutter operation is stopped. At the time t80, the operation of each of the vertical scanning unit 16, the column circuit 12, the column A/D conversion unit 13, the horizontal scanning unit 15, the signal processing unit 18 and the transmitting unit 19 are in a stopped state. A time t81 onwards indicates a reading sequence. At the time t81, training sequence generating operation of the training sequence generating unit 182 is started, and the transmitting unit 19 starts output, whereby training sequence data is output from the transmitting unit 19.

At a time t82, operation of each of the vertical scanning unit 16 and the column A/D conversion unit 13 is started.

The vertical scanning unit 16 selects the first row of non-effective pixels 101. During a period from a time t82 to a time t83, signals of the non-effective pixels 101 in the first row are read, and the column A/D conversion unit 13 performs analog-to-digital conversion of the signals of the first row. Digital values N(1) and S(1) obtained as a result of the analog-to-digital conversion are written in the respective writing memories NMEM_W and SMEM_W in the column digital memory 14. "1" in a square box in FIG. 8 indicates the digital values N(1) and S(1) of the pixels in the first row. Specific reading operation is the operation during the period from the time t31 to the time t38 in FIG. 3. Since the horizontal scanning unit 15 remains off, data input to the pixel signal processing unit 181 remain as non-effective data.

During a period from a time t83 to a time t84, signals of the non-effective pixels 101 in the second row are read. The reading operation is the same as the operation during the period from the time t31 to the time t38 in FIG. 3. At the time t84, the column digital memory 14 has a capacity for only one row, and thus, the digital values N(1) and S(1) in the first row are overwritten and digital values N(2) and S(2) in the second row remain. At the time t84 onwards, signals of non-effective pixels 101 in the third row onwards are read in turn.

From a time t85 to a time t87, operation for switching from the training sequence to pixel output operation is performed. At the time t85, operation for reading signals of the non-effective pixels 101 in the first row is started. At a time t86 during reading of signals of the non-effective pixels 101 in the first row, the receiving unit of the signal processor provides a notification for reading effective pixels 100 to the controlling unit 17 at the stage of completion of clock recovery and completion of preparation for pixel signal reception. If the analog-to-digital conversion of the signals of the non-effective pixels 101 in the first row is completed at the time t86, the controlling unit 17 causes the horizontal scanning unit 15 to start horizontal scanning operation during a period from the time t86 to a time t87. If the analog-to-digital conversion of the signals of the non-effective pixels 101 in the first row is not completed at the time t86, the controlling unit 17 causes the horizontal scanning unit 15 to start horizontal scanning operation after completion of the analog-to-digital conversion of the signals of the non-effective pixels 101 in the first row.

At the time t87, reading of the signals of the non-effective pixels 101 in the second row is started, and the training sequence generating unit 182 terminates the training sequence generating operation, and outputs the digital values N(1) and S(1) from the column digital memory 14 to the pixel signal processing unit 181. Furthermore, according to control performed by the controlling unit 17, the selecting unit 183 in the signal processing unit 18 terminates the output of the output signals of the training sequence generating unit 182, and the pixel signal processing unit 181 starts output of the output signals. Then, the output signals of the transmitting unit 19 are switched from the training sequence data to the pixel output signals. Since the column digital memory 14 holds the digital values N(1) and S(1) of the first row obtained as a result of the analog-to-digital conversion before the switching, the transmitting unit 19 can output the pixel output signals with no waiting period after the termination of the training sequence. The reading operation during the period of times t85 to t87 is the same as the reading operation during the period of times t50 to t57 in FIG. 5. Depending on the timing for clock recovery in the receiving unit of the signal processor, the reading method during the period of times t85 to t87 may be the reading method in the times t60 to t65 in FIG. 6. Consequently, a waiting period from start of charge accumulation for long seconds of time until start of reading can be reduced.

Second Exemplary Embodiment

A configuration of a solid-state imaging apparatus 1000 according to a second exemplary embodiment of the present invention is the same as that in FIG. 1 in the first exemplary embodiment, and a configuration of a pixel region 10 is the same as that in FIG. 2 in the first exemplary embodiment.

Figure 9:
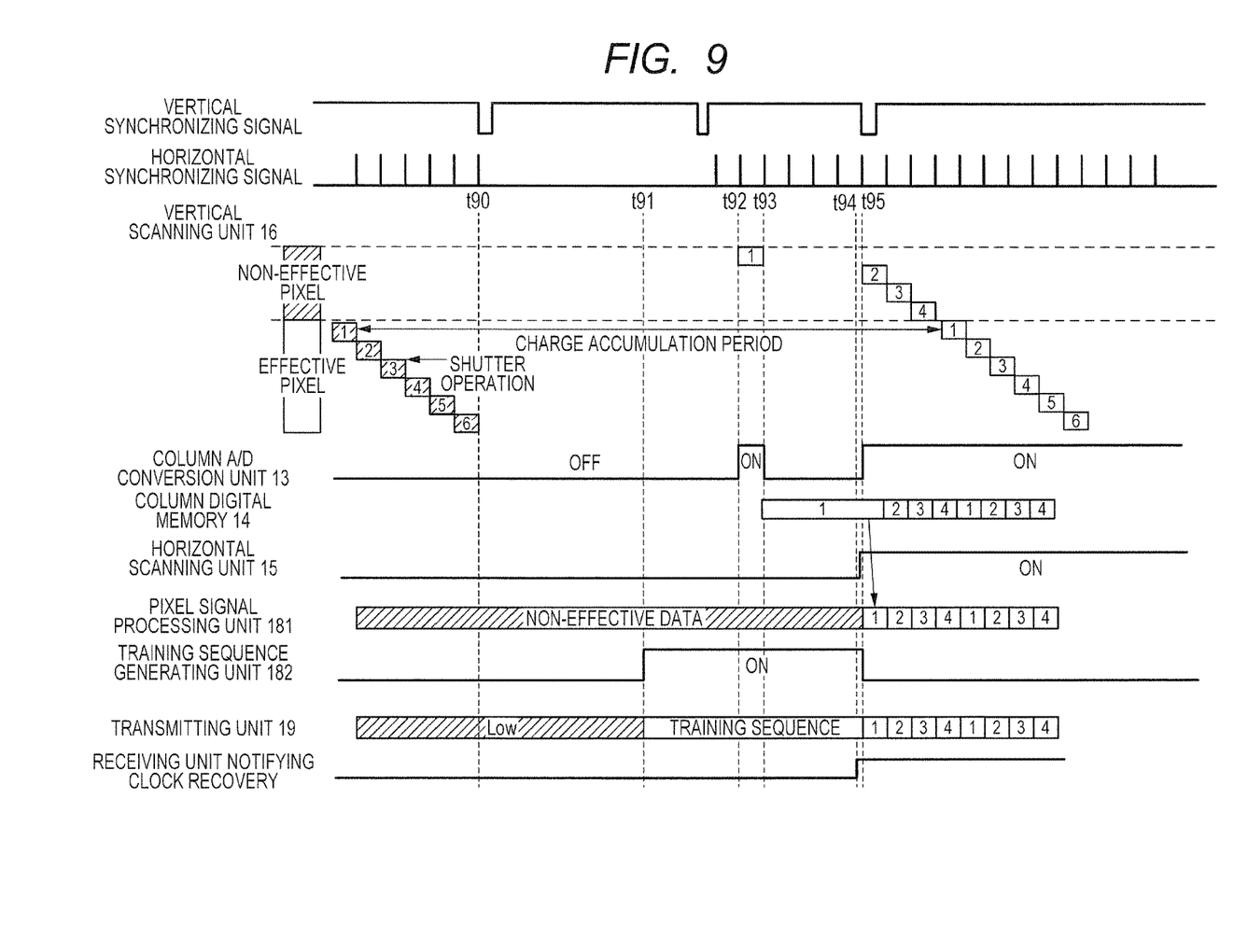
FIG. 9 is a timing chart at the time of charge accumulation for long seconds of time in the solid-state imaging apparatus.

FIG. 9 is a timing chart at the time of charge accumulation for long seconds of time in the solid-state imaging apparatus 1000 according to the second exemplary embodiment of the present invention. In FIG. 9, for simplicity, four rows of non-effective pixels 101 and six rows of effective pixels 100 are illustrated; however, in reality, more rows and more columns of pixels are arranged. At a time t90, shutter operation is stopped. At the time t90, operation of each of a vertical scanning unit 16, a column circuit 12, a column A/D conversion unit 13, a horizontal scanning unit 15, a signal processing unit 18 and a transmitting unit 19 is in a stopped state. A time t91 onwards indicate a reading sequence. At the time t91, a training sequence generating unit 182 starts training sequence generating operation, and the transmitting unit 19 starts output. Consequently, training sequence data is output from the transmitting unit 19.

At a time t92, operation of the vertical scanning unit 16 and the column A/D conversion unit 13 is started. The vertical scanning unit 16 selects a first row of non-effective pixels 101. During a period from the time t92 to a time t93, signals of the non-effective pixels 101 in the first row are read, and the column A/D conversion unit 13 performs analog-to-digital conversion of the signals of the first row. Digital values N(1) and S(1) obtained as a result of the analog-to-digital conversion are written into respective writing memories NMEM_W and SMEM_W in a column digital memory 14. "1" in a square box in FIG. 9 indicates the digital values N(1) and S(1) of the first row. Specific reading operation is the operation during the period from the time t31 to time t38 in FIG. 3. Since the horizontal scanning unit 15 remains off, data input to the pixel signal processing unit 181 remain as non-effective data.

At the time t93 onwards, the scanning of non-effective pixels 101 by the vertical scanning unit 16 and the analog-to-digital conversion operation of the column A/D conversion unit 13 are stopped. Consequently, further power consumption reduction in the pixel scanning and the analog-to-digital conversion operation can be achieved.

From a time t94 to a time t95, switching from the training sequence to pixel output operation is made. At the time t94, a receiving unit of a signal processor provides a notification for reading effective pixels 100, to the controlling unit 17 at the stage of completion of clock recovery and completion of preparation for pixel signal reception. If the analog-to-digital conversion of the signals of the non-effective pixels 101 in the first row is completed at the time t94, the controlling unit 17 causes the horizontal scanning unit 15 to start horizontal scanning operation during the period from the time t94 to the time t95. If the analog-to-digital conversion of the signals of the non-effective pixels 101 in the first row is not completed at the time t94, the controlling unit 17 causes the horizontal scanning unit 15 to start horizontal scanning operation after completion of the analog-to-digital conversion of the signals of the first row.

At the time t95, reading of signals of non-effective pixels 101 in a second row is started, the training sequence generating unit 182 terminates the training sequence generating operation, and data is output from the column digital memory 14 to the pixel signal processing unit 181. Furthermore, according to control performed by the controlling unit 17, a selecting unit 183 in the signal processing unit 18 terminates the output of the output signals from the training sequence generating unit 182 and starts output of the output signals of the pixel signal processing unit 181. Consequently, the output data of the transmitting unit 19 is switched from the training sequence data to the pixel output signals. The column digital memory 14 holds the digital values N(1) and S(1) of the non-effective pixels 101 in the first row obtained as a result of the analog-to-digital conversion before the switching. Thus, the transmitting unit 19 can output the pixel output signals with no waiting period after the termination of the training sequence.

The reading operation in the times t 94 to t95 is the same as the reading operation in the times t50 to t57 in FIG. 5. Depending on the timing for clock recovery in the receiving unit of the signal processor, the reading operation in the times t94 to t95 may be the reading operation in the times t60 to t65 in FIG. 6. Consequently, a waiting period from start of charge accumulation for long second of time until start of reading can be reduced. Also, at the time of training sequence transmission, the analog-to-digital conversion operation of the column A/D conversion unit 13 is stopped, enabling reduction in power consumption.

As described above, the column A/D conversion unit 13 converts the analog signals output by the non-effective pixels 101 in the first row into digital values during the period of the times t92 to t93 in which the transmitting unit 19 is transmitting the training sequence data, and then stops the conversion operation. Subsequently, the column A/D conversion unit 13 resumes the conversion operation at the time t95 when the transmitting unit 19 starts transmission of digital signals that are based on the digital values obtained as a result of the conversion by the column A/D conversion unit 13.

The first and second exemplary embodiments enable reduction of a waiting period at the time of imaging mode switching or a waiting period until effective pixel output at the time of driving for charge accumulation for long seconds of time.

Third Exemplary Embodiment

Figure 10:
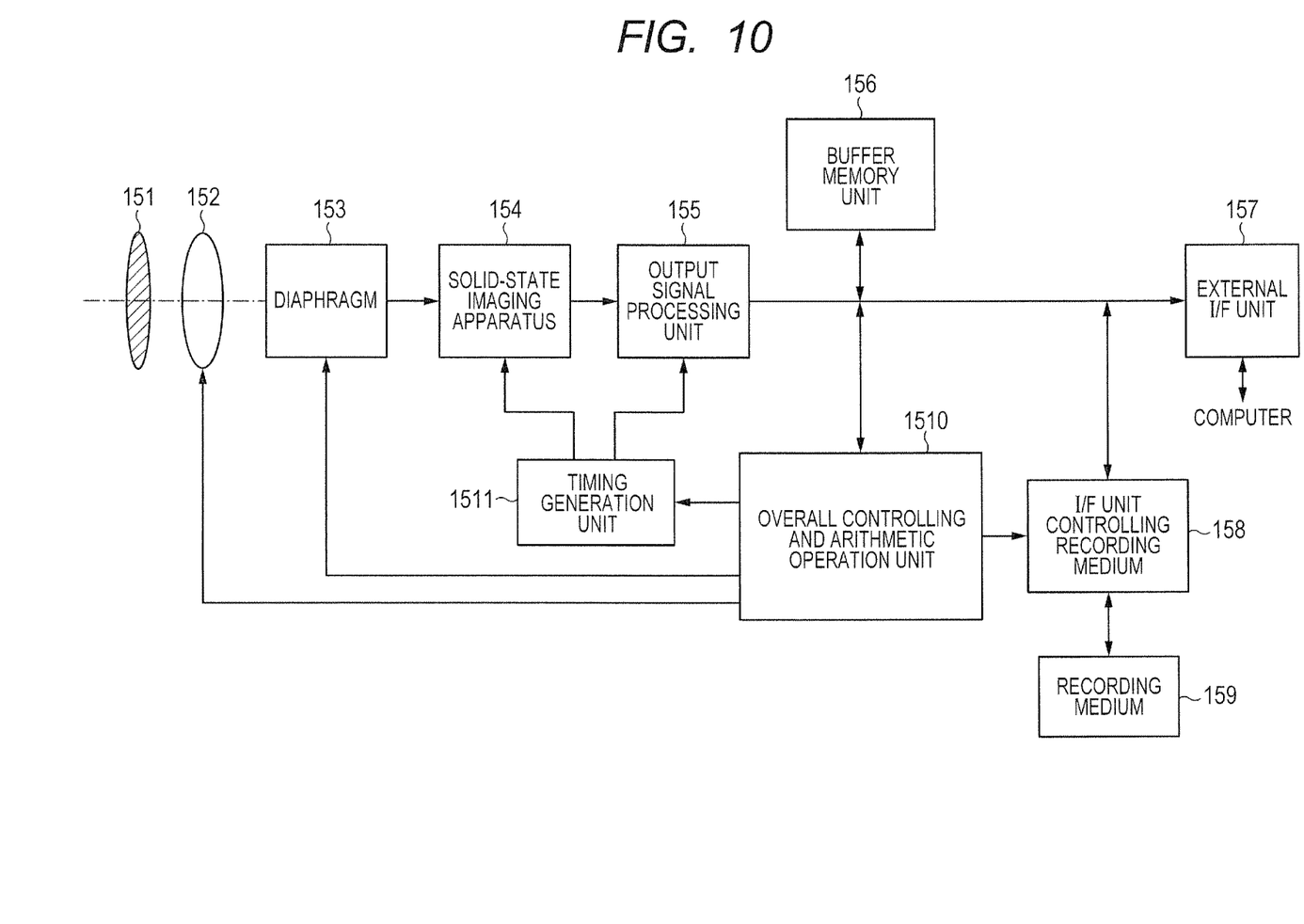
FIG. 10 is a diagram illustrating an overall configuration of an imaging system.

The solid-state imaging apparatuses described in the respective exemplary embodiments above can be employed in various imaging systems. Examples of the imaging systems include digital still cameras, digital camcoders and monitoring cameras. FIG. 10 is a diagram of an imaging system with a solid-state imaging apparatus 1000 according to any of the above-described exemplary embodiments employed in a digital still camera, as an example of the imaging system. The solid-state imaging apparatus 154 in FIG. 10 corresponds to the above solid-state imaging apparatus 1000. The imaging system illustrated in FIG. 10 includes the solid-state imaging apparatus 154, a barrier 151 for protection of a lens 152, a lens 152 for forming an optical image of an object on the solid-state imaging apparatus 154, and a diaphragm 153 for varying an amount of light passing through the lens 152. The lens 152 and the diaphragm 153 are included in an optical system for collecting light to the solid-state imaging apparatus 154. Also, the imaging system illustrated in FIG. 10 includes an output signal processing unit 155 that performs processing of output signals output by a transmitting unit 19 of the solid-state imaging apparatus 154. The output signal processing unit 155 generates an image based on digital signals output by the transmitting unit 19 of the solid-state imaging apparatus 154. More specifically, the output signal processing unit 155 also performs various corrections and compression of output image data as necessary.

The imaging system illustrated in FIG. 10 further includes a buffer memory unit 156 for temporarily storing image data, and an external interface unit (external I/F unit) 157 for communication with, e.g., an external computer. Furthermore, the imaging system includes a recording medium 159 such as a semiconductor memory for recording or reading taken image data, and a recording medium controlling interface unit (recording medium controlling I/F unit) 158 for recording onto or reading from the recording medium 159. The recording medium 159 may be incorporated in the imaging system or may be removable from the imaging system.

The imaging system further includes an overall controlling and arithmetic operation unit 1510 that controls various arithmetic operations and the entire digital still camera, and a timing generation unit 1511 that outputs various timing signals to the solid-state imaging apparatus 154 and the output signal processing unit 155. Here, the timing signals may be ones input from the outside, and the imaging system may include at least the solid-state imaging apparatus 154, and the output signal processing unit 155 that processes output signals output from the solid-state imaging apparatus 154.

As described above, the imaging system of the present exemplary embodiment can perform imaging operation using the solid-state imaging apparatus 154.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-250278, filed Dec. 10, 2014, which is hereby incorporated by reference herein in its entirety.

What is claimed is:

1. A solid-state imaging apparatus comprising:
a pixel region that outputs an analog signal;
an analog-to-digital conversion unit configured to convert the analog signal into a digital signal; and
a transmitting unit configured to perform a transmission of a test signal and the digital signal obtained as a result of the conversion by the analog-to-digital conversion unit, the digital signal being transmitted subsequently to the test signal,
wherein the analog-to-digital conversion unit converts the analog signal into the digital signal during a period in which the transmission of the test signal by the transmitting unit is performed, and
wherein the analog-to-digital conversion unit includes a memory including a first memory and a second memory, data is transferred from the first memory to the second memory after the conversion of the analog signal into the digital signal, and the transmitting unit transmits the data from the second memory.

2. The solid-state imaging apparatus according to claim 1, wherein upon input of a test completion notification, the transmitting unit terminates the transmission of the test signal and starts transmission of the digital signal obtained as a result of the conversion by the analog-to-digital conversion unit.

3. The solid-state imaging apparatus according to claim 1, wherein the pixel region outputs the analog signal to the analog-to-digital conversion unit during the period of the transmission of the test signal by the transmitting unit.

4. The solid-state imaging apparatus according to claim 1, wherein the pixel region starts output of the analog signal to the analog-to-digital conversion unit after the transmitting unit starts the transmission of the test signal.

5. The solid-state imaging apparatus according to claim 1, wherein:
the pixel region includes a plurality of pixels arranged in a matrix, each of the plurality of pixels outputting an analog signal; and
the plurality of pixels sequentially output the analog signals to the analog-to-digital conversion unit on a row-by-row basis.

6. The solid-state imaging apparatus according to claim 5, wherein:
the pixel region includes a row of effective pixels each including a photoelectric conversion portion and a row of non-effective pixels each including no photoelectric conversion portion; and
wherein the row of the non-effective pixels outputs the respective analog signals to the analog-to-digital conversion unit during the period of the transmission of the test signal by the transmitting unit.

7. The solid-state imaging apparatus according to claim 6, wherein during the period of the transmission of the test signal by the transmitting unit, the analog-to-digital conversion unit stops conversion operation after converting analog signals output by a row of the non-effective pixels into digital signals and resumes the conversion operation when the transmitting unit starts transmission of the digital signals obtained as a result of the conversion by the analog-to-digital conversion unit.

8. The solid-state imaging apparatus according to claim 5, wherein during the period of the transmission of the test signal by the transmitting unit, the analog-to-digital conversion unit stops conversion operation after converting analog signals output by one row of the pixels into digital signals and resumes the conversion operation when the transmitting unit starts transmission of the digital signals obtained as a result of the conversion by the analog-to-digital conversion unit.

9. The solid-state imaging apparatus according to claim 1, further comprising an 8b10b conversion unit configured to perform 8b10b conversion of the test signal and the digital signal obtained as a result of the conversion by the analog-to-digital conversion unit,
wherein the transmitting unit transmits the test signal subjected to the 8b10b conversion and subsequently transmits the digital signal subjected to the 8b10b conversion.

10. The solid-state imaging apparatus according to claim 1, further comprising a selecting unit configured to select one of the digital signal and the test signal, and to output the selected signal.

11. The solid-state imaging apparatus according to claim 10, wherein the selecting unit selects the test signal during the converting the analog signal into the digital signal, and selects the digital signal after the conversion of the analog signal into the digital signal.

12. The solid-state imaging apparatus according to claim 1, wherein, after receiving a signal of notification of completion of clock recovery in a receiving unit, the transmission of the digital signal starts.

13. The solid-state imaging apparatus according to claim 1, wherein the test signal includes data for clock recovery.

14. An imaging system comprising:
a solid-state imaging apparatus; and
an output signal processing unit configured to generate an image based on a digital signal output from a transmitting unit of the solid-state imaging apparatus, wherein:
the solid-state imaging apparatus includes
a pixel region configured to output an analog signal,
an analog-to-digital conversion unit configured to convert the analog signal into a digital signal, and
a transmitting unit configured to perform a transmission of a test signal and the digital signal obtained as a result of the conversion by the analog-to-digital conversion unit, the digital signal being transmitted subsequently to the test signal,
wherein the analog-to-digital conversion unit converts the analog signal into the digital signal during a period in which the transmission of the test signal by the transmitting unit is performed, and
wherein the analog-to-digital conversion unit includes a memory including a first memory and a second memory, data is transferred from the first memory to the second memory after the conversion of the analog signal into the digital signal, and the transmitting unit transmits the data from the second memory.

15. A method for driving a solid-state imaging apparatus including a pixel region configured to output an analog signal and an analog-to-digital conversion unit configured to convert the analog signal into a digital signal, the method comprising:

Performing a transmission of a test signal via a transmitting unit;

converting the analog signal into a digital signal via the analog-to-digital conversion unit during a period in which the transmission of the test signal by the transmitting unit is performed; and terminating the transmission of the test signal and subsequently transmitting the digital signal obtained as a result of the conversion by the analog-to-digital conversion unit, via the transmitting unit, wherein the analog-to-digital conversion unit includes a memory including a first memory and a second memory, and wherein the method further comprises transferring data from the first memory to the second memory after the conversion of the analog signal into the digital signal, and transmitting the data from the second memory.

* * * * *